US010970998B1

(12) United States Patent
Lange et al.

(10) Patent No.: US 10,970,998 B1
(45) Date of Patent: Apr. 6, 2021

(54) SYSTEMS, METHODS, AND DEVICES FOR REMOTELY CONTROLLING FUNCTIONALITIES OF VEHICLES (71) Applicant: Ford Global Technologies, LLC, Dearborn, MI (US)

(72) Inventors: Christian Lange, Ferndale, MI (US); Ryan Oberholzer, Ann Arbor, MI (US); Laura Longworth, Fruitport, MI (US); Dennis Sartorello, Birmingham, MI (US); Vivien Jean Martinage, Grosse Pointe Farms, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/589,771

(22) Filed: Oct. 1, 2019

(51) Int. Cl.
| | | |
|---|---|---|
| *G08C 17/02* | (2006.01) | |
| *B60R 16/023* | (2006.01) | |
| *B60K 37/06* | (2006.01) | |
| *G06F 3/0488* | (2013.01) | |
| *G06F 3/0481* | (2013.01) | |
| *H04W 4/48* | (2018.01) | |
| *B60H 1/00* | (2006.01) | |
| *B60N 2/02* | (2006.01) | |
| *E05B 81/00* | (2014.01) | |
| *E05F 15/77* | (2015.01) | |

(52) U.S. Cl.
CPC .............. *G08C 17/02* (2013.01); *B60K 37/06* (2013.01); *B60R 16/0231* (2013.01); *G06F 3/0488* (2013.01); *B60H 1/00657* (2013.01); *B60K 2370/1438* (2019.05); *B60N 2/0224* (2013.01); *E05B 81/00* (2013.01); *E05F 15/77* (2015.01); *E05Y 2400/85* (2013.01); *E05Y 2900/55* (2013.01); *G06F 3/04817* (2013.01); *G08C 2201/32* (2013.01); *G08C 2201/34* (2013.01); *H04W 4/48* (2018.02)

(58) Field of Classification Search
None
See application file for complete search history.

(56) References Cited

U.S. PATENT DOCUMENTS 9,530,265 B2 * 12/2016 Lee ..................... G07C 9/00658

* cited by examiner

*Primary Examiner* — K. Wong
(74) *Attorney, Agent, or Firm* — Frank Lollo; Eversheds Sutherland (US) LLP (57) ABSTRACT Systems, methods, and devices for remotely controlling functionalities of vehicles are disclosed herein. Example systems, methods and devices may include determining that a remote control device is located at a position associated with a functionality, establishing a communication connection between the remote control device and the functionality based on a machine readable medium associated with the position, and causing a user interface on the remote control device to present one or more settings associated with the functionality.

20 Claims, 10 Drawing Sheets

SYSTEMS, METHODS, AND DEVICES FOR REMOTELY CONTROLLING FUNCTIONALITIES OF VEHICLES

TECHNICAL FIELD

The present disclosure relates to remotely controlling functionalities of vehicles. Some embodiments are directed to systems, methods and devices for remotely controlling functionalities of vehicles.

BACKGROUND

A primary interface for vehicle systems and functions include one or more knobs and buttons, and one or more vehicle interior controls for controlling heating, ventilation, and air conditioning (HAVC), windows, lighting, music, audio head, climate head, and shifters, etc. Typically, a vehicle interior control only performs one function for a product lifetime. The vehicle interior controls are fixed at respective locations and are accessible only to a driver and/or a front passenger of the vehicle. Thus, the vehicle interior controls are not accessible to the front passenger and/or backseat passengers of the vehicle. Further, packaging restrictions make the vehicle interior control costly and difficult to add new features once a cockpit design of the vehicle is complete.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The systems, methods and devices disclosed herein are configured to remotely controlling one or more functionalities from vehicle interior controls to third-party services based on a position of a remote control device. A functionality describes a controllable and/or selectable function associated with a vehicle, e.g., driving information review and/or search, user comfort settings control, vehicle controls, entertainment, wayfinding, lock control, window switches control, seat adjustment control, one or more software applications, and the like. By changing the position associated the remote control device, different functionalities are provided. The remote control device may be passed between vehicle inhabitants such that the functionalities are accessible to different occupants, e.g., drivers, front passengers, and/or backseat passengers. The functionalities may be added, removed, and different/or updated via a software update (e.g., an over-the-air update). In some instances, the systems, methods and devices may apply Sensor Fusion, Machine Learning and/or Artificial Intelligence to learn and adapt to various occupants. For example, usage data, device sensor data such as position and biometrics, and vehicle data such as weather, vehicle inertial data, and location are used to understand the occupants' behaviors better and offer the occupants access to their desired content more effectively.

An occupant may interact with the remote control device to execute one or more functionalities associated with various positions relative to the vehicle. Different positions relative to the vehicle may be associated with different functionalities. For instance, a remote control device is placed at a first position to execute functionalities associated with the first position. A different remote control device placed at a second position may execute different functionalities associated with the second position. If the different remote control device is placed at the same position as the remote control device, the different remote control device may execute the same functionalities as the remote control device. Examples are further described with respect to FIG. 1 and FIG. 2.

The occupant may interact with the remote control device to execute one or more functionalities associated with various positions relative to the remote control device. The remote control device may control different functionalities based on different positions relative to the remote control device, even if a position relative to the vehicle of the remote control device is changed. A position change relative to the remote control device may be caused by tapping or swiping a screen, rotating the entire remote control device, tilting the remote control device, picking the remote device up to hold the remote control device, speaking to the remote control device, and the like. Examples are further described with respect to FIG. 3.

The remote control device may function inside and/or outside a vehicle. The remote control device includes a high resolution touch display, a microprocessor, and a series of internal sensors in a round, hand-sized form factor. Examples are further described with respect to FIG. 7 and FIG. 8.

Illustrative Embodiments

Figure 1:
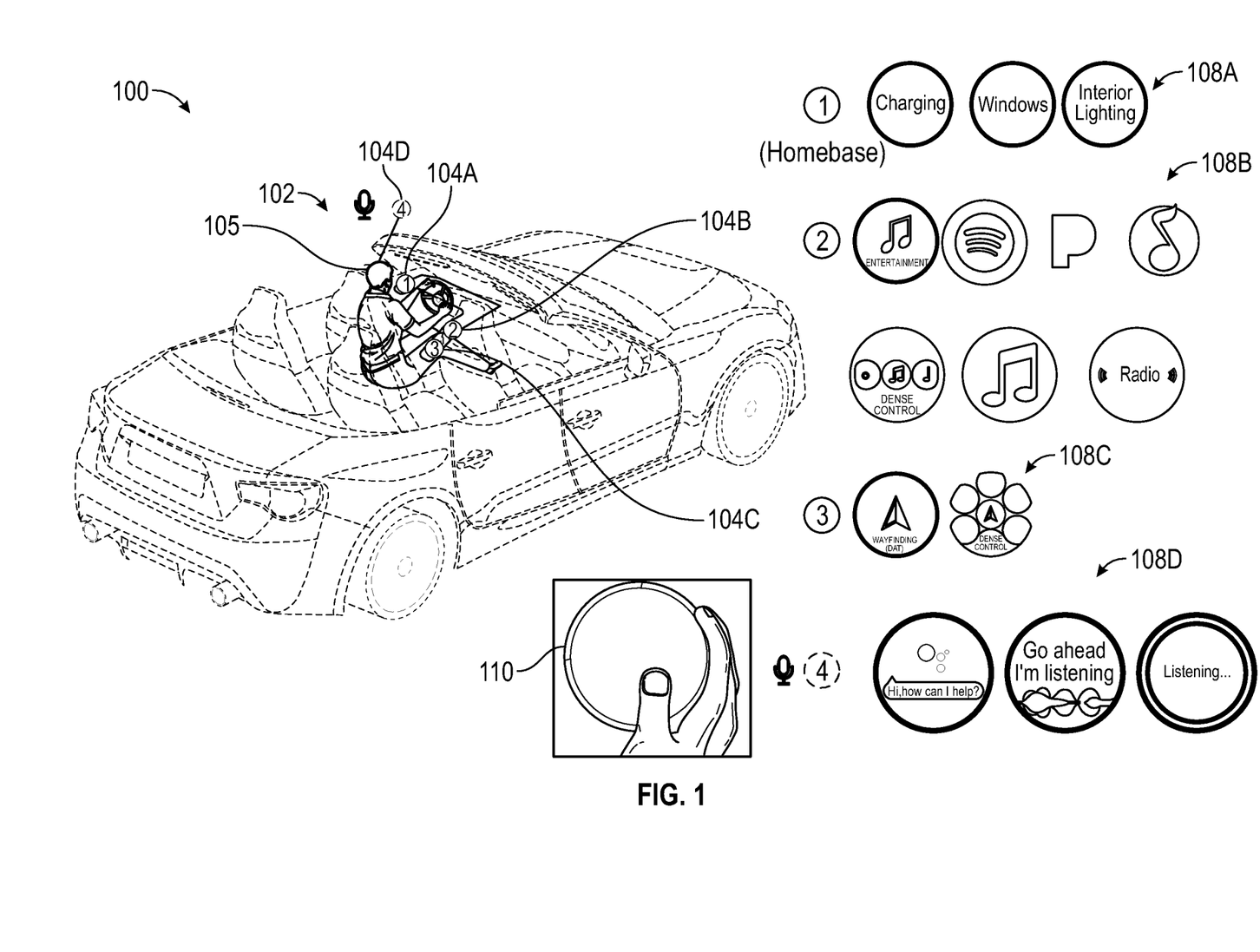
FIG. 1 depicts a schematic illustration of an example implementation for remotely controlling functionalities of a vehicle in accordance with one or more embodiments of the disclosure.

Turning now to the drawings, FIG. 1 depicts a schematic illustration of an example implementation 100 for remotely controlling functionalities 108A-108D of a vehicle 102 based on positions relative to the vehicle 102 in accordance with one or more embodiments of the disclosure. An occupant 105 may be a driver, a front passenger or a backseat passenger in the vehicle 102.

The vehicle 102 may include one or more remote control devices 110. A remote control device 110 may remotely control one or more functionalities 108A-108D of the vehicle 102 based on positions 104A-104D where the occupant 105 places the remote control device 110. A first position 104A is associated with functionalities 108A, such as charging, window controls, and interior lighting controls. A second position 104B is associated with functionalities 108B, such as one or more user preferred entertainment applications. A third position 104C is associated with functionalities 108C, such as one or more wayfinding applications. If the occupant 105 places the remote control device 110 at a position (e.g., the first position 104A, the second position 104B, or the third position 104C), the vehicle 102 may determine where the remote control device 110 is located. The vehicle 102 may establish a communication connection between the remote control device 110 and one or more functionalities (e.g., the functionalities 108A, the functionalities 108B, or the functionalities 108C) associated with the position based on a machine readable medium associated with the position. The machine readable medium may include one or more radio frequency identification (RFID) tags, one or more media using a Bluetooth connectivity, one or more media using a Bluetooth low energy (BLE) connectivity, one or more wireless antennas, or some combination thereof. The vehicle 102 may cause a user interface on the remote control device 110 to present one or more settings associated with the one or more functionalities.

As shown in FIG. 1, the vehicle 102 may receive an audio input and generate an audio and/or visual output 108D. For instance, the remote control device 110 of the vehicle 102 is placed at a fourth position 104D to execute one or more functionalities associated with the audio input and audio/visual output 108D. However, it should be understood that the remote control device 110 may be placed at a location (e.g., the first position 104A, the second position 104B, the third position 104C or any other position) other than the fourth position to receive an audio command from the occupant 105. The remote control device 110 may generate an audio and/or visual output 108D, such as an audio/visual feedback in response to the audio command, an audio/visual output indicating that a status of a currently executed functionality, and/or an audio/visual output indicating that a status of the remote control device 110 for receiving the audio command.

The vehicle 102 may further include one or more memories including computer-executable instructions, and one or more computing processors configured to access the one or more memories and execute the computer-executable instructions. For instance, the vehicle 102 may execute the computer-executable instructions to determine that the remote control device 110 is located at the position, to establish a communication connection between the remote control device 110 and functionalities associated with the position, and to cause the user interface on the remote control device 110 to present one or more settings associated with the one or more functionalities. In some embodiments, the one or more memories including computer-executable instructions, and one or more computing processors configured to access the one or more memories and execute the computer-executable instructions may be included in the remote control device 110.

The vehicle 102 may establish a communication connection between the remote control device 110 and functionalities associated with a position based on one or more machine readable media that are included at the position of the vehicle 102. For instance, a first readable medium (e.g., a RFID tag, or the like) may be included at the first position 104A. The vehicle 102 may determine that the remote control device 110 is located at the first position 104A based on the first readable medium. The vehicle 102 may transmit a signal indicative of the first position 104A by the first machine readable medium located at the first position 104A of the vehicle 102. The vehicle 102 may cause a communication between the first machine readable medium located at the first position 104A and the vehicle 102 based on the signal indicative of the first position 104A. The vehicle 102 may establish a communication connection between the remote control device 110 and the functionalities 108A based on the communication.

The vehicle 102 may establish a communication connection between the remote control device 110 and functionalities associated with a position based on one or more machine readable media that are included in the remote control device 110. For instance, a second machine readable medium (e.g., a RFID tag, or the like) may be included in the remote control device 110. The vehicle 102 may receive sensor data from one or more sensors of the remote control device 110. The sensor data indicates that the remote control device 110 is placed at the first position 104A as an example. A sensor may include an inertial measurement unit (IMU), a magnetometer (compass) module, a near field/far field motion sensor, an ambient light sensor, or some combination thereof. The vehicle 102 may cause a communication between a second machine readable medium of the remote control device 110 and the vehicle 102. The vehicle 102 may establish a communication connection between the remote control device 110 and the functionalities 108A.

The occupant 105 may interact with the remote control device 110 to execute functionalities associated with positions relative to the vehicle 102. For instance, the remote control device 110 may be moved from the first position 104A to the second position 104B to execute the functionalities 108B. The vehicle 102 may determine a movement change of the remote control device 110 moving from the first position 104A to the second position 104B. The vehicle 102 may disestablish a first communication connection between the remote control device 110 and the functionalities 108A based at on the movement change. The vehicle 102 may establish a second communication connection between the remote control device 110 and the functionalities 108B based on one or more machine readable media associated with the second position 104B. The machine readable media may be included at the second position 104B of the vehicle 102, or included in the remote control device 110. The vehicle 102 may cause the user interface on the remote control device 110 to present one or more settings associated with the functionalities 180B.

The movement change may be detected by one or more sensors of the vehicle 102 and/or by the sensors of the remote control device 110.

The vehicle 102 may receive a user input based on the user interaction with the remote control device 110 to modify the one or more settings associated with the functionalities. The user interaction may include tapping or swiping a screen, rotating the entire remote control device, tilting the remote control device, picking the remote device up to hold the remote control device, speaking to the remote control device, and the like.

The remote control device 110 may include a touch display, one or more sensors to generate sensor data, the one or more memories including computer-executable instructions, and the one or more computing processors to access the one or more memories and execute the computer-executable instructions.

Figure 2:
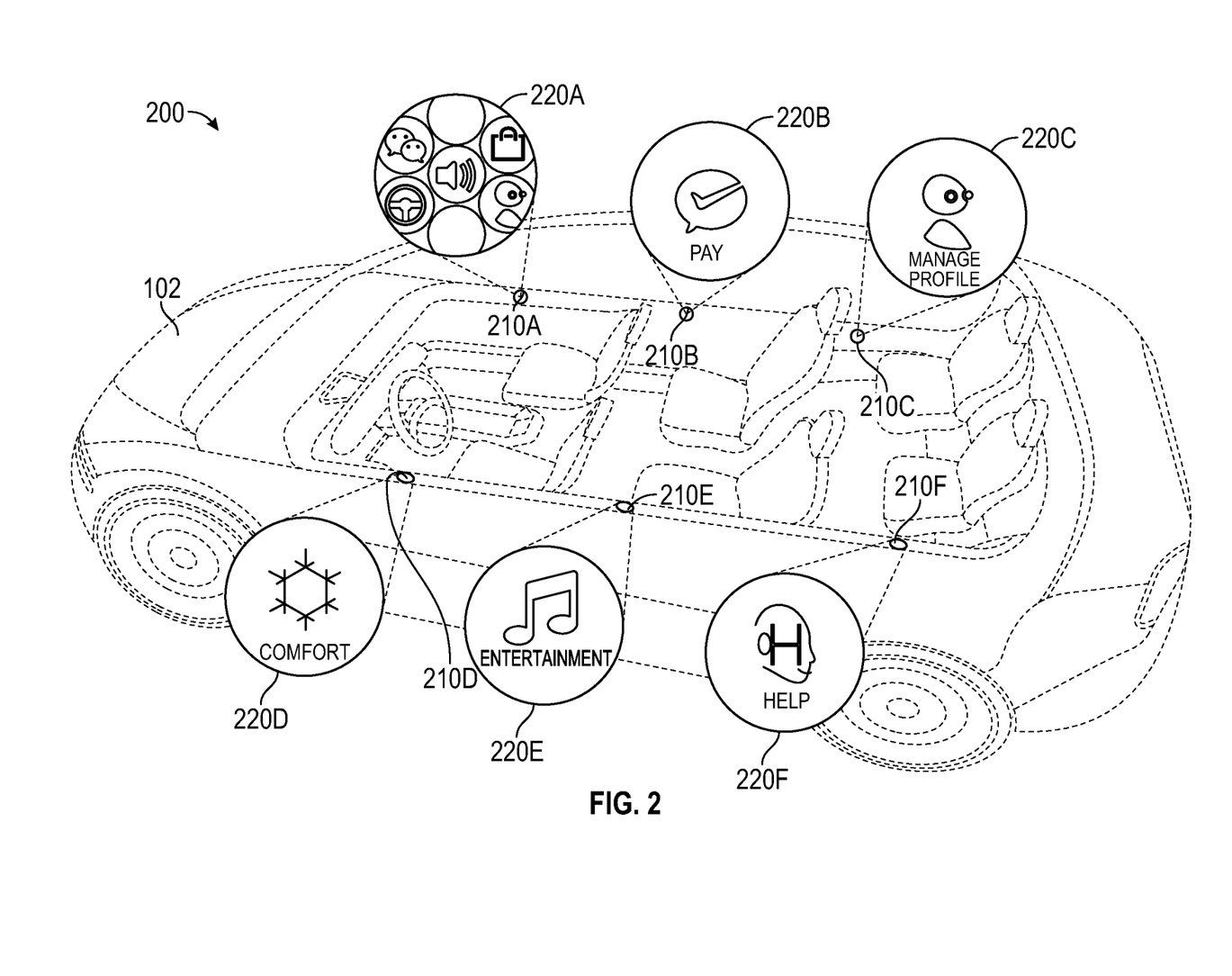
FIG. 2 depicts a schematic illustration of an example implementation for remotely controlling functionalities of a vehicle based on positions relative to the vehicle in accordance with one or more embodiments of the disclosure.

FIG. 2 depicts a schematic illustration of an example implementation 200 for remotely controlling functionalities 220A-220F of the vehicle 102 based on positions 210A-210F relative to the vehicle 102 in accordance with one or more embodiments of the disclosure. Different functionalities 220A-220F may be associated with respective positions 210A-210-F. In some embodiments, a single remote control device 110 may be placed at a particular position of the positions 210A-210F to execute functionalities associated with the particular position. The single remote control device 110 may be passed over from one occupant (e.g., a driver, or a front passenger) to another occupant (e.g., a backseat passenger) to be placed at a position proximate the later occupant to execute functionalities associated with the position. In other instances, the vehicle 102 may include multiple remote control devices 110. Each of the multiple remote control devices 110 may be placed at a respective position (e.g., positions 210A-210F). Each of the multiple remote control devices 110 may execute respective functionalities 220A-220F associated with the positions 210A-210F.

Figure 3:
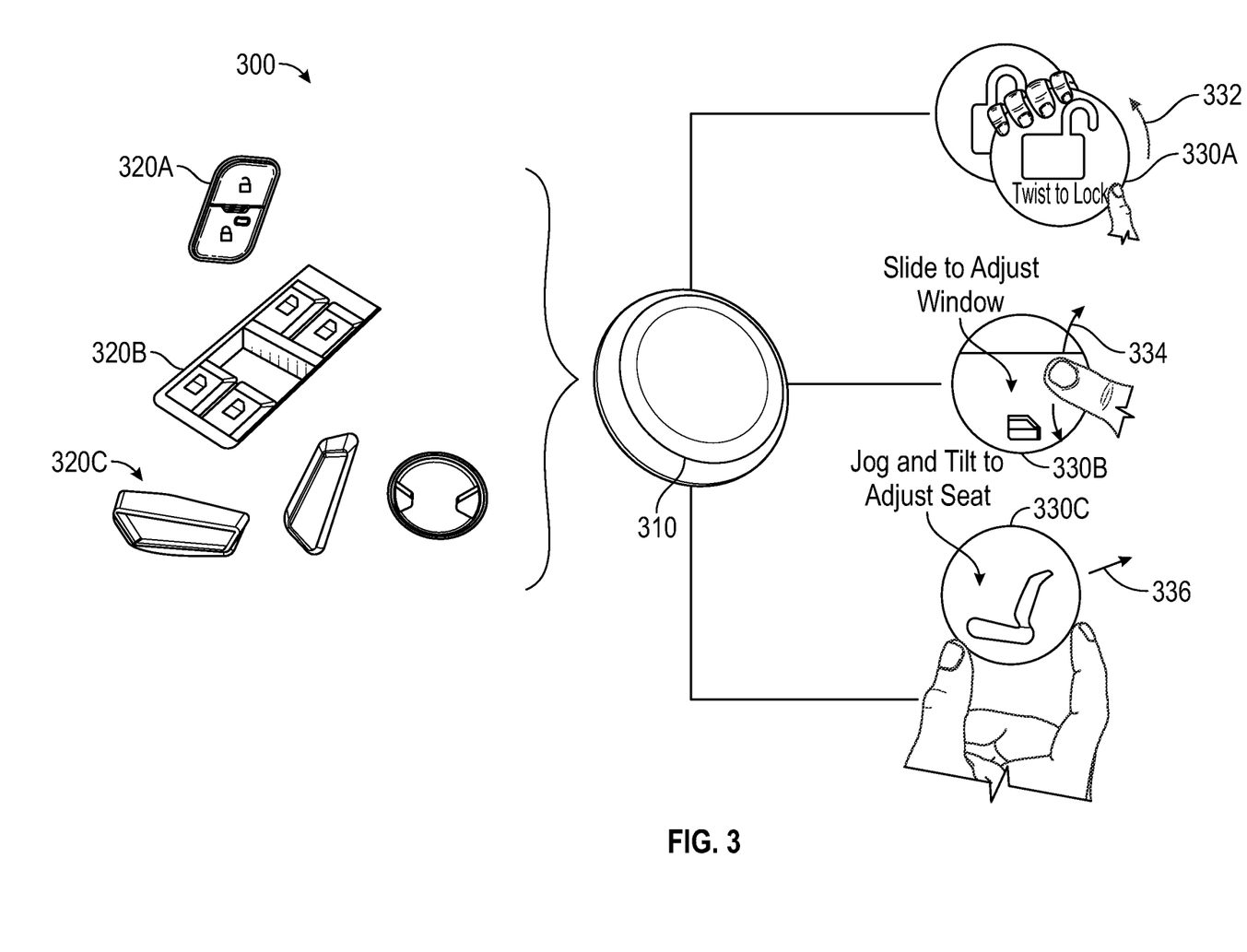
FIG. 3 depicts an example process flow for remotely controlling functionalities of a vehicle based on positions relative to a remote control device in accordance with one or more embodiments of the disclosure.

FIG. 3 depicts a schematic illustration of an example implementation 300 for remotely controlling functionalities 330A-330C of the vehicle 102 based on positions 332-336 relative to a remote control device 310 in accordance with one or more embodiments of the disclosure. The remote control device 310 may be one of embodiments of the remote control device 110. Multiple functionalities (e.g., a lock control 320A, a window control 320B, and a seat adjustment control 320C) in a typical vehicle may be executed by the single remote control device 310 based on various positions relative to the remote control device 310, even if a position relative to the vehicle 102 of the remote control device 310 is changed. For instance, the occupant 105 may twist 332 the remote control device 310 to execute a lock control 330A, slide 334 the remote control device 310 to execute a window control 330B, jog and tilt 336 the remote control device 310 to execute a seat adjustment control 330C. The vehicle 102 may determine a movement change of the remote control device 310 moving from a twisting position 332 to a sliding position 334 relative to the remote control device 310. The vehicle 102 may disestablish a first communication connection between the remote control device 310 and the lock control 330A based on the movement change. The vehicle 102 may establish a second communication connection between the remote control device 310 and the window control 330B. The vehicle 102 may cause a user interface on the remote control device 310 to present one or more settings associated with the window control 330B. The movement change may be detected by one or more sensors of the remote control device 110. The vehicle 102 may determine a movement change of the remote control device 310 moving from the first position 104A to the second position 104B relative to the vehicle 102. The vehicle 102 may maintain the functionalities associated with positions relative to the remote control device 310.

In some embodiments, each occupant may have a remote control device 310 placed proximate to a respective occupant. The occupant may pivot the remote control device 310 to pick it up to hold the remote control device for a user input. The vehicle 102 may receive a user input based on the user interaction with the remote control device 110 to modify the one or more settings associated with the functionalities.

Figure 4:
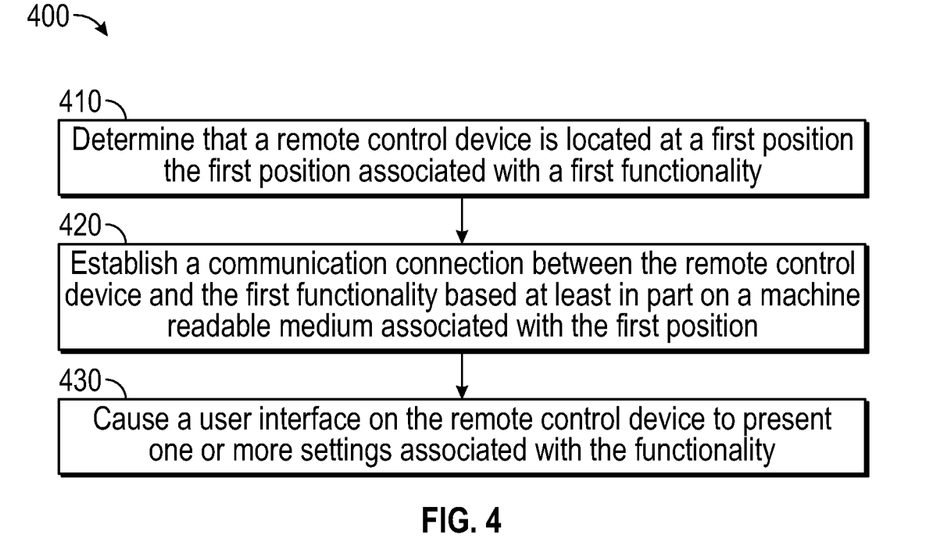
FIG. 4 depicts an example process flow for remotely controlling functionalities of vehicles in accordance with one or more embodiments of the disclosure.

FIG. 4 depicts an example process flow 400 for remotely controlling functionalities of vehicles in accordance with one or more embodiments of the disclosure.

At block 410 of the process flow 400, one or more computer processors of a vehicle and/or a remote control device may execute computer-executable instructions stored on memory to determine that the remote control device is located at a position, the position associated with a functionality. The position (e.g., the positions 104A-104D in FIG. 1, or the positions 210A-210F in FIG. 2) may be relative to the vehicle. The position (e.g., the positions in 332-336 in FIG. 3) may also be relative to the remote control device. The position may be determined based on sensor data of the remote control device. The position may be determined based on one or more machine readable media associated with the position. The machine readable media may be included at the position of the vehicle. In some embodiments, the machine readable media may be included in the remote control device.

At block 420 of the process flow 400, one or more computer processors of a vehicle and/or a remote control device may execute computer-executable instructions stored on memory to establish a communication connection between the remote control device and the functionality based on a machine readable medium associated with the position. In one example, the machine readable medium is included at the position of the vehicle. The vehicle may transmit a signal indicative of the position by the machine readable medium. The vehicle may cause a communication between the machine readable medium based on the signal. The vehicle may establish the communication connection between the remote control device and the functionality based on the communication. As another example, the machine readable medium is included in the remote control device. The vehicle may receive sensor data from one or more sensors of the remote control device. The sensor data indicates that the remote control device is placed at the position. The vehicle may cause a communication between the machine readable medium and the vehicle. The vehicle 102 may establish a communication connection between the remote control device and the functionality based on the communication.

At block 430 of the process flow 400, one or more computer processors of a vehicle and/or a remote control device may execute computer-executable instructions stored on memory to cause a user interface on the first remote control device to present one or more settings associated with the functionality. The vehicle may receive a user input based on a user interaction with the remote control device to modify the one or more settings associated with the functionality.

Figure 5:
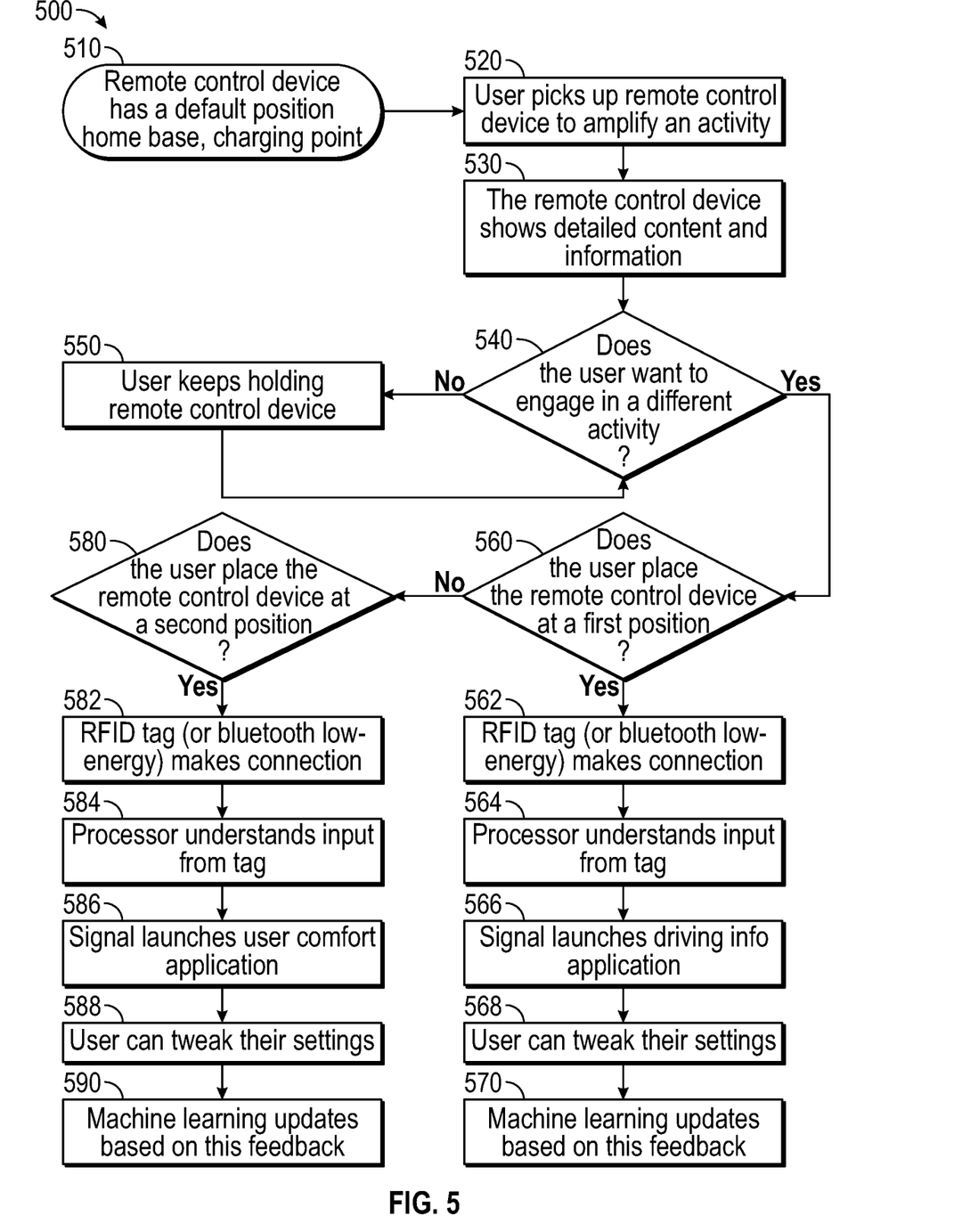
FIG. 5 depicts an example process flow for remotely controlling functionalities of vehicles in accordance with one or more embodiments of the disclosure.

FIG. 5 depicts an example process flow 500 for remotely controlling functionalities of vehicles in accordance with one or more embodiments of the disclosure. Steps 510-590 may be performed by one or more computer processors of a vehicle and/or a remote control device. For instance, one or more computer processors of a vehicle and/or a remote control device may execute computer-executable instructions stored on memory to execute a driving information application based on an RFID tag, or a Bluetooth/BLE connectivity that is associated with a first position, and/or to execute a user comfort application based on an RFID tag, or a Bluetooth/BLE connectivity that is associated with a second position.

Figure 6:
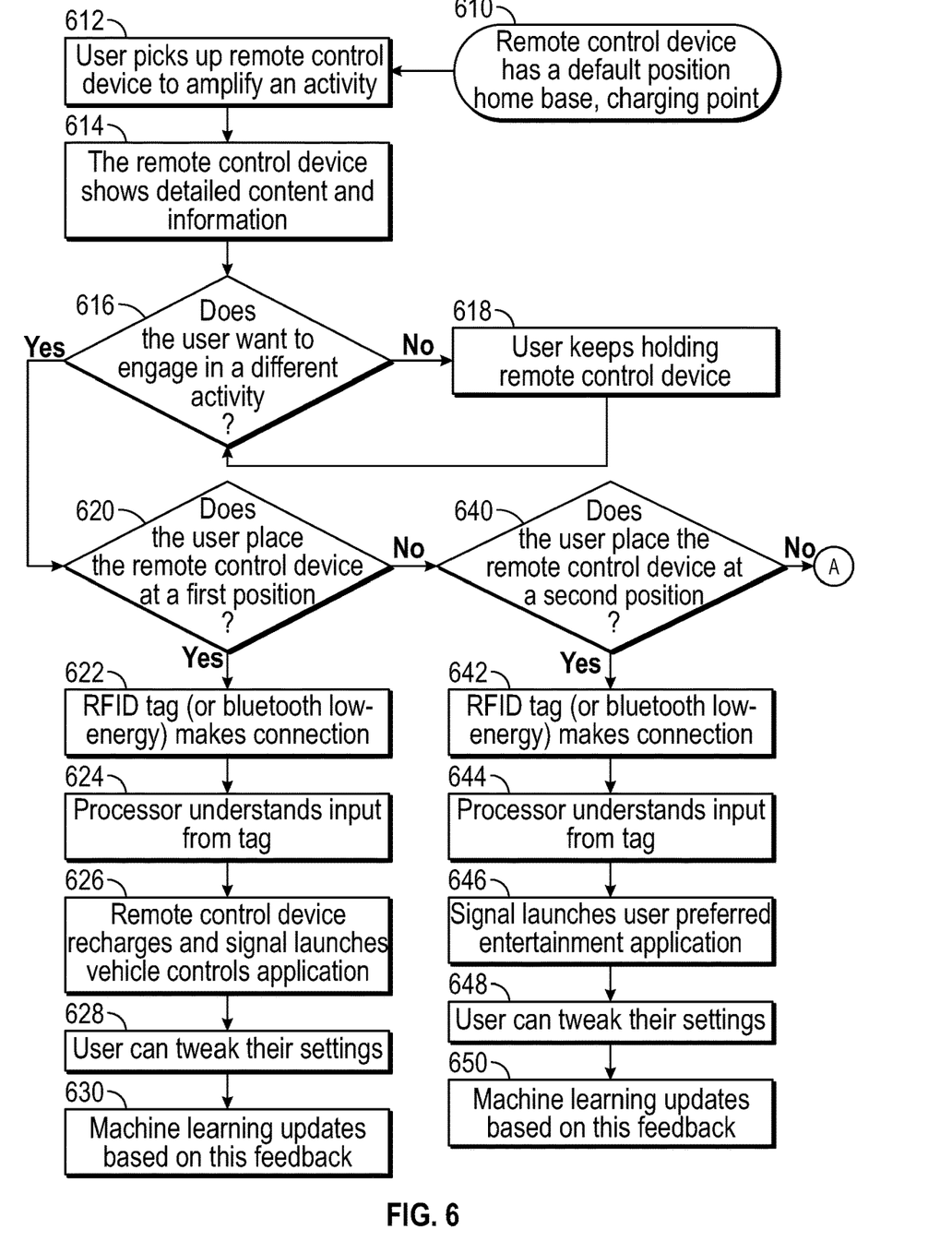
FIG. 6 depicts an example process flow for remotely controlling functionalities of vehicles in accordance with one or more embodiments of the disclosure.

FIG. 6 depicts an example process flow 600 for remotely controlling functionalities of vehicles in accordance with one or more embodiments of the disclosure. Steps 610-682 may be performed by one or more computer processors of a vehicle and/or a remote control device. For instance, one or more computer processors of a vehicle and/or a remote control device may execute computer-executable instructions stored on memory to execute a vehicle control application based on an RFID tag or a Bluetooth/BLE connectivity that is associated with a first position, to execute a user preferred entertainment application based on a RFID tag, or a Bluetooth/BLE connectivity that is associated with a second position, to execute a wayfinding application based on a RFID tag, or a Bluetooth/BLE connectivity that associated with a third position, and/or to execute an audio-command based application based on a RFID tag, or a Bluetooth/BLE connectivity that is associated with a fourth position.

Figure 7:
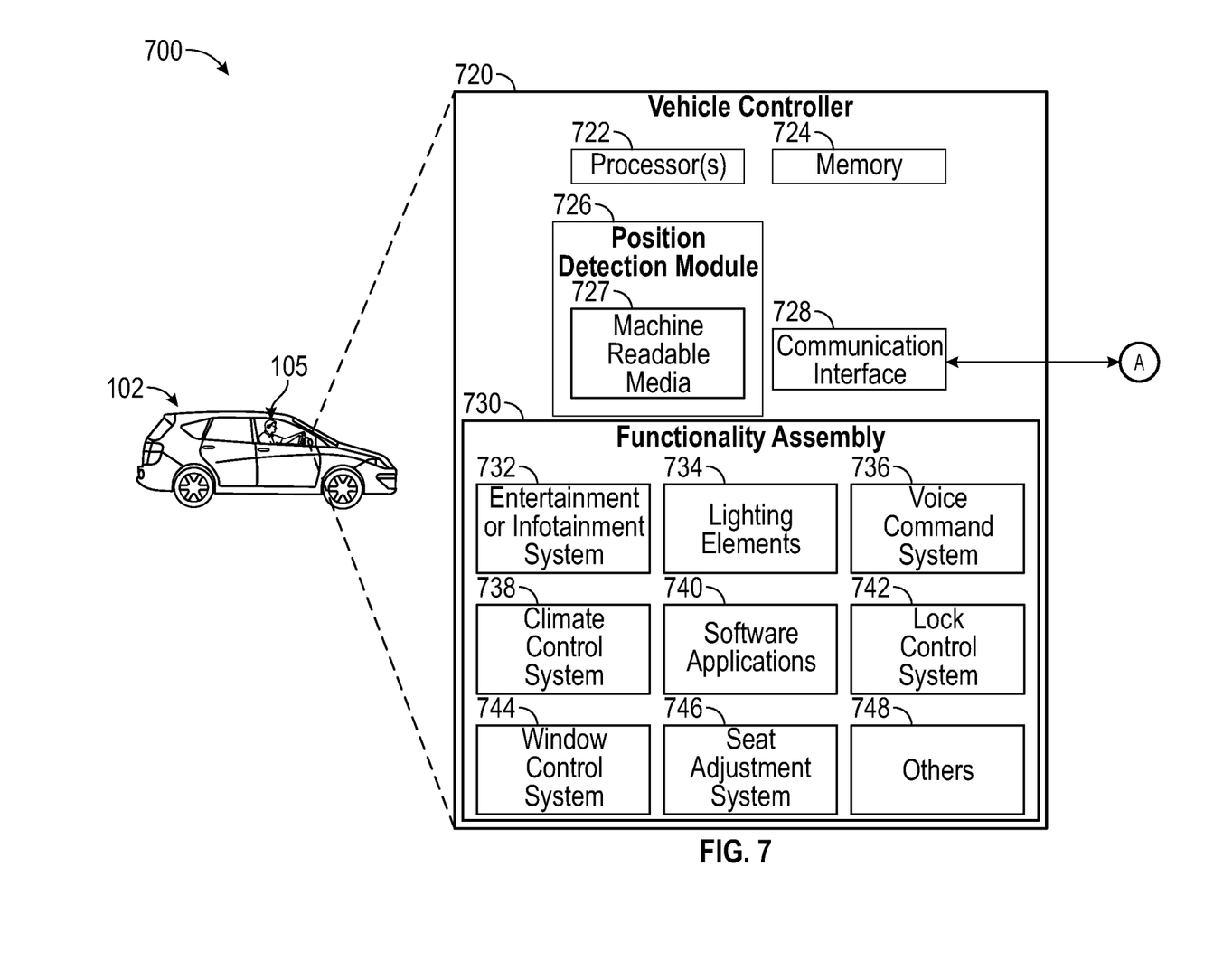
FIG. 7 depicts an illustrative architecture in which techniques and structures for providing the systems and methods disclosed herein may be implemented.

FIG. 7 depicts an illustrative architecture 700 in which techniques and structures for providing the systems and methods disclosed herein may be implemented. The illustrative architecture 700 may include vehicle 102, one or more remote control devices 110(1), 110(2), 110(3), 110(S), and a network 760. The network 760 may include any one or a combination of multiple different types of networks, such as cable networks, the Internet, wireless networks, and other private and/or public networks. In some instances, the network 750 may include cellular, Wi-Fi, or Wi-Fi direct.

The vehicle 102 generally includes a vehicle controller 720 and a functionality assembly 730. Generally described, the vehicle controller 720 includes one or more processors 722 and one or more memories 724. The memory 724 stores instructions that may be executed by the processor 722 to perform various functions or operations disclosed herein, and/or to instruct the remote control device 110 to remotely control the assembly 730 in accordance with the present disclosure. The vehicle controller 720 may also include a communications interface 728 that allows the vehicle controller 720 to communicate with the remote control device 110 over the network 760. The vehicle controller 720 may also include a position detection module 726 that may determine where the remote control device 110 is located. The position detection module 726 may include one or more machine readable media 727. In some embodiments, the position detection module 726 can be included in the remote control device 110.

The functionality assembly 730 may include any one or more of an entertainment or infotainment system 732, one or more lighting elements 734, a voice command system 736, one or more seat sensors and/or components 737, a climate control system 738, one or more software applications 740, a lock control system 742, a window control system 744, a seat adjustment system 746, and other functionalities 748.

The entertainment or infotainment system 732 is configured to provide visual and/or auditory output for the occupant 105 such as music, videos, or other media. The lighting elements 734 include any lighting devices that are located within the cabin of the vehicle 102. Some of these lighting elements 734 have selectable luminance and/or hue. Thus, the vehicle controller 720 may instruct the remote control device 110 selectively alter or change the luminance and/or hue of the one or more lights.

The voice command system 736 may include any automated voice controlled system that allows the occupant 105 to interact with the vehicle controller 720 and/or the remote control device 110 using words, phrases, or natural language input. For example, the voice command system 736 may be used to instruct a user in utilizing the functionalities of the vehicle 102.

The climate control system 738 allows a user to select a temperature within the vehicle 102 as well as control other aspects of climate such as seat heating or cooling. The vehicle controller 720 may also cause the climate control system 738 to activate heaters in a seat where the user is located using one or more seat sensors.

A software applications 740 may be a computer program designed to perform a group of coordinated functions, tasks, or activities for the benefit of the occupant 105. Example of the software application can include a driving information application, a user comfort application, a vehicle controls application, a user preferred entertainment application, a wayfinding application, and/or any suitable computer program that perform tasks for the benefit of the occupant 105. The lock control system 742 controls one or more locks of the vehicle 102. The window control system 744 controls one or more windows of the vehicle 102. The seat adjustment system 746 adjusts seat position for one or more seats of the vehicle. The other functionalities 748 may include a scent dispenser that is configured to output scents, one or more biometric sensors that collect biometric data such as heart rate, pulse, body temperature, or other similar biometric data, and/or any other suitable functionality associated with the vehicle 102.

The remote control device 110 may be configured to remotely control the functionality assembly 730. The remote control device 110 generally includes one or more processors 772, one or more memories 774, one or more I/O interfaces 776, a communication interface 778, a sensor module 780, the position detection module 726, a charging module 784, a haptic module 786, and one or more I/O components 790.

The memory 774 stores instructions that may be executed by the processor 772 to perform various functions or operations disclosed herein. In general, the processor 772 may execute the instructions stored in the memory 774 to remotely control the functionality assembly 730. The processor 772 may also execute the instructions stored in the memory 774 to receive one or more inputs and to generate one or more outputs via the I/O interfaces 776 and I/O components 790. The communications interface 778 that allows the remote control device 110 to communicate with the vehicle controller 720 over the network 760. In some embodiments, the remote control device 110 may also include the position detection module 726.

The one or more I/O interfaces 776 allow for the coupling I/O components 790 to the remote control device 110. The I/O interfaces 776 may include inter-integrated circuit ("I2C"), serial peripheral interface bus ("SPI"), universal serial bus ("USB"), RS-232, RS-432, and so forth.

The I/O components 790 may include one or more displays 792, one or more touch sensors 794, one or more audio input/output components 796, and other suitable I/O components 798. The display 792 may be a high resolution display, a touchscreen, or a liquid crystal or electrophoretic display elements. The touch sensor 794 may include interpolating force sensing resistor ("IFSR") arrays, capacitive sensors, optical touch sensors, and so forth. The audio input/output components 796 may include speakers, and microphones. The other I/O components 798 may include external memory devices, global positioning system receivers that may be coupled to the remote control device 110 using the I/O interfaces 776.

The sensor module 780 may determine a movement relative to the remote control device 110 and a movement relative to the vehicle 102. The sensor module 780 may include an IMU module 782, one or more magnetometer (compass) module 784, one or more sensors 785, and one or more machine readable media 727. The one or more sensors 785 can include a near field motion sensor, a far field motion sensor, a near/far field motion sensor, an ambient light senor, any other suitable sensor, or some combination thereof. The sensor module 780 may determine movements generated in FIG. 3, such as one or more twisting positions, one or more sliding positions, and one or more jogging and tilting positions relative to the remote control device 110. The sensor module 780 may determine the movement of the remote control device 110 relative to the vehicle 102.

The charging module 784 may include one or more batteries, and/or one or more charging antennas. The haptic module 786 may generate haptic motions associated with actions performed by the occupant 105, and/or associated with one or more functionalities in the functionality assembly 730 that are currently executed by the remote control device 110.

Figure 8:
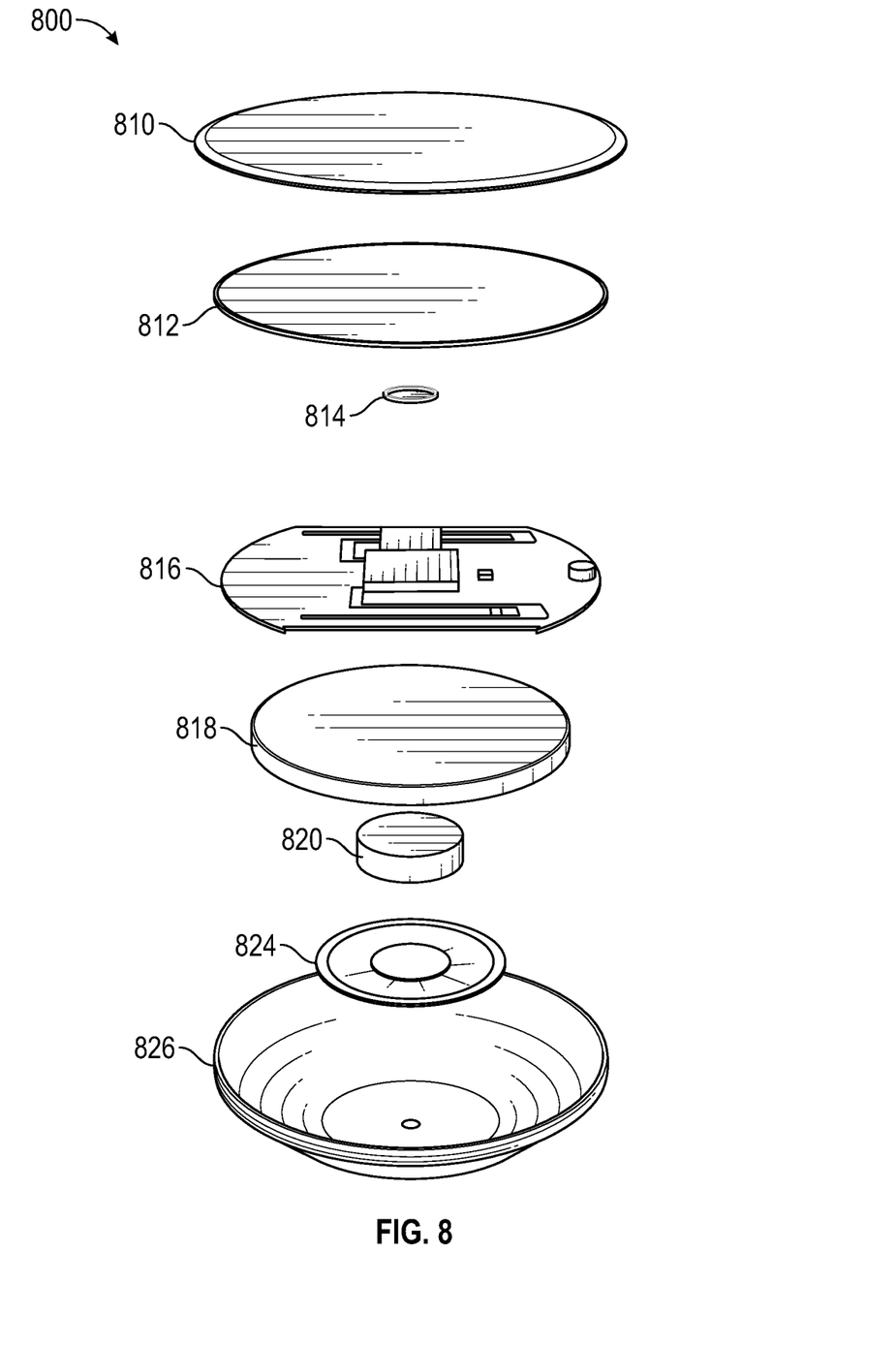
FIG. 8 depicts a schematic exploded illustration of an example remote control device in accordance with one or more embodiments of the disclosure.

FIG. 8 depicts a schematic illustration of an example remote control device 800 in accordance with one or more embodiments of the disclosure. The remote control device 800 is one of embodiments of the remote control device 110. The remote control device 800 includes a lens 810, a touch display 812, a microphone 814, a circuit board 816, a battery 818, a haptic motor 820, a charging antenna 824, and a magnetic reactive PC enclosure 826. The circuit board 816 may include a microprocessor, a IMU module, a magnetometer module, one or more near/far filed motion sensors, one or more ambient light sensors, one or more machine readable media.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media may be any available media that may be accessed by a general purpose or special purpose computer system. Computer-readable media that stores computer-executable instructions is computer storage media (devices). Computer-readable media that carries computer-executable instructions is transmission media. Thus, by way of example, and not limitation, implementations of the present disclosure may comprise at least two distinctly different kinds of computer-readable media: computer storage media (devices) and transmission media.

Computer storage media (devices) includes RAM, ROM, EEPROM, CD-ROM, solid state drives (SSDs) (e.g., based on RAM), flash memory, phase-change memory (PCM), other types of memory, other optical disk storage, magnetic disk storage or other magnetic storage devices, or any other medium which may be used to store desired program code means in the form of computer-executable instructions or data structures and which may be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media may include a network and/or data links, which may be used to carry desired program code means in the form of computer-executable instructions or data structures and which may be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein may be performed in one or more of hardware, software, firmware, digital components, or analog components. For example, one or more application specific integrated circuits (ASICs) may be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail may be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "may," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A vehicle comprising:
   a first remote control device configured to remotely control one or more functionalities of the vehicle;
   at least one memory comprising computer-executable instructions; and
   one or more computing processors configured to access the at least one memory and execute the computer-executable instructions to:
      determine that the first remote control device is located at a first position within the vehicle, the first position associated with a first functionality of the vehicle;
      establish a first communication connection between the first remote control device and the first functionality based at least in part on a first machine readable medium associated with the first position; and
      cause a user interface on the first remote control device to present one or more settings associated with the first functionality.

2. The vehicle of claim 1, wherein establishing the first communication connection between the first remote control device and the first functionality based at least in part on the first machine readable medium associated with the first position comprises:
   transmitting a signal indicative of the first position by the first machine readable medium located at the first position of the vehicle;
   causing, based at least in part on the signal indicative of the first position, a communication between the first machine readable medium located at the first position and the first remote control device; and
   establishing the first communication connection between the first remote control device and the first functionality of the vehicle based at least in part on the communication.

3. The vehicle of claim 1, wherein establishing the first communication connection between the first remote control device and the first functionality based at least in part on the first machine readable medium associated with the first position comprises:
   receiving sensor data from one or more sensors of the first remote control device, the sensor data indicative of the first position;
   causing, based at least in part on the sensor data indicative of the first position, a communication between the first machine readable medium of the first remote control device and the vehicle; and
   establishing the first communication connection between the first remote control device and the first functionality based at least in part on the communication.

4. The vehicle of claim 1, wherein the one or more computing processors configured to access the at least one memory and execute the computer-executable instructions to:
   determine a movement change of the first remote control device moving from the first position to a second position;
   disestablish the first communication connection between the first remote control device and the first functionality based at least in part on the movement change;
   establish a second communication connection between the first remote control device and a second functionality of the one or more functionalities based at least in part on a second machine readable medium associated with the second position; and
   cause the user interface on the first remote control device to present one or more settings associated with the second functionality.

5. The vehicle of claim 1, further comprising a second remote control device, wherein the one or more computing processors is further configured to access the at least one memory and execute the computer-executable instructions to:
   determine that the second remote control device is located at the first position of the vehicle;

establish a second communication connection between the second remote control device and the first functionality based at least in part on a second machine readable medium associated with the first position; and cause a user interface on the second remote control device to present the one or more settings associated with the first functionality.

6. The vehicle of claim 1, further comprising a second remote control device, wherein the one or more computing processors is further configured to access the at least one memory and execute the computer-executable instructions to:

determine that the second remote control device is located at a second position of the vehicle;

establish a second communication connection between the second remote control device and a second functionality based at least in part on a second machine readable medium associated with the second position; and cause a user interface on the second remote control device to present one or more settings associated with the second functionality.

7. The vehicle of claim 1, wherein the one or more computer processors are further configured to access the at least one memory and execute the computer-executable instructions to:

determine a movement change of the first remote control device moving from the first position to a second position; and maintain the first communication connection at the second position.

8. The vehicle of claim 1, wherein the one or more computer processors are further configured to access the at least one memory and execute the computer-executable instructions to:

receive a user input based at least in part on one or more user interactions between the first remote control device and at least one passenger of the vehicle; and modify the one or more settings associated with the first functionality based at least in part on the user input.

9. A remote control device comprising:

a touch display;

one or more sensors configured to generate sensor data;

one or more machine readable media configured to communicate with a vehicle based at least in part on the sensor data, at least one memory comprising computer-executable instructions; and one or more computing processors configured to access the at least one memory and execute the computer-executable instructions to:

receive the sensor data from the one or more sensors, the sensor data indicating that the remote control device is located at a first position within the vehicle;

cause, based at least in part on the sensor data indicative of the first position, a first communication connection between the one or more machine readable media of the remote control device and the vehicle;

establish a second communication connection between the remote control device and a first functionality of the vehicle based at least in part on the first communication connection, the first functionality associated with the first position; and cause a user interface on the remote control device to present one or more settings associated with the first functionality.

10. The remote control device of claim 9, wherein the one or more computing processors configured to access the at least one memory and execute the computer-executable instructions to:

determine a movement change of the remote control device moving from the first position to a second position based at least in part on the sensor data;

disestablish the second communication connection between the remote control device and the first functionality of the vehicle based at least in part on the movement change;

cause, based at least in part on the sensor data indicative of the second position, a third communication connection between the one or more machine readable media of the remote control device and the vehicle;

establish a fourth communication connection between the remote control device and a second functionality of the vehicle based at least in part on the third communication connection; and cause the user interface on the touch display to present one or more settings associated with the second functionality.

11. The remote control device of claim 9, wherein the one or more computer processors are further configured to access the at least one memory and execute the computer-executable instructions to:

determine a movement change of the remote control device moving from the first position to a second position; and maintain the first communication connection at the second position.

12. The remote control device of claim 9, wherein the one or more computer processors are further configured to access the at least one memory and execute the computer-executable instructions to:

receive a user input based at least in part on one or more user interactions between the user interface and at least one passenger of the vehicle; and modify the one or more settings associated with the first functionality based at least in part on the user input.

13. A system, comprising:

a vehicle;

a first remote control device configured to remotely control one or more functionalities of the vehicle;

at least one memory comprising computer-executable instructions; and one or more computing processors configured to access the at least one memory and execute the computer-executable instructions to:

determine that the first remote control device is located at a first position within the vehicle, the first position associated with a first functionality;

establish a first communication connection between the first remote control device and the first functionality based at least in part on a first machine readable medium associated with the first position; and cause a user interface on the first remote control device to present one or more settings associated with the first functionality.

14. The system of claim 13, wherein establishing the first communication connection between the first remote control device and the first functionality based at least in part on the first machine readable medium associated with the first position comprises:

transmitting a signal indicative of the first position by the first machine readable medium located at the first position of the vehicle;

causing, based at least in part on the signal indicative of the first position, a communication between the first machine readable medium located at the first position and the first remote control device; and establishing the first communication connection between the first remote control device and the first functionality of the vehicle based at least in part on the communication.

15. The system of claim 13, wherein establishing the first communication connection between the first remote control device and the first functionality based at least in part on the first machine readable medium associated with the first position comprises:

receiving sensor data from one or more sensors of the first remote control device, the sensor data indicative of the first position;

causing, based at least in part on the sensor data indicative of the first position, a communication between the first machine readable medium of the first remote control device and the vehicle; and establishing the first communication connection between the first remote control device and the first functionality based at least in part on the communication.

16. The system of claim 13, wherein the one or more computing processors configured to access the at least one memory and execute the computer-executable instructions to:

determine a movement change of the first remote control device moving from the first position to a second position;

disestablish the first communication connection between the first remote control device and the first functionality based at least in part on the movement change;

establish a second communication connection between the first remote control device and a second functionality of the one or more functionalities based at least in part on a second machine readable medium associated with the second position; and cause the user interface on the first remote control device to present one or more settings associated with the second functionality.

17. The system of claim 13, further comprising a second remote control device, wherein the one or more computing processors is further configured to access the at least one memory and execute the computer-executable instructions to:

determine that the second remote control device is located at the first position of the vehicle;

establish a second communication connection between the second remote control device and the first functionality based at least in part on a second machine readable medium associated with the first position; and cause a user interface on the second remote control device to present the one or more settings associated with the first functionality.

18. The system of claim 13, further comprising a second remote control device, wherein the one or more computing processors is further configured to access the at least one memory and execute the computer-executable instructions to:

determine that the second remote control device is located at a second position of the vehicle;

establish a second communication connection between the second remote control device and a second functionality based at least in part on a second machine readable medium associated with the second position; and cause a user interface on the second remote control device to present one or more settings associated with the second functionality.

19. The system of claim 13, wherein the one or more computer processors are further configured to access the at least one memory and execute the computer-executable instructions to:

determine a movement change of the first remote control device moving from the first position to a second position; and maintain the first communication connection at the second position.

20. The system of claim 13, wherein the one or more computer processors are further configured to access the at least one memory and execute the computer-executable instructions to:

receive a user input based at least in part on one or more user interactions between the first remote control device and at least one passenger of the vehicle; and modify the one or more settings associated with the first functionality based at least in part on the user input.

* * * * *